United States Patent
Uraneck et al.

[15] 3,674,753

[45] July 4, 1972

[54] STABILIZATION OF POLYMER-ALKALI METAL MERCAPTIDES

[72] Inventors: Carl A. Uraneck; William J. Trepka, both of Bartlesville, Okla.

[73] Assignee: Phillips Petroleum Company

[22] Filed: July 2, 1970

[21] Appl. No.: 52,140

[52] U.S. Cl..................260/79, 260/45.75 R, 260/45.75 K, 260/94.7 HA, 260/94.7 S
[51] Int. Cl........................................................C08g 23/00
[58] Field of Search................260/79, 94.7, 94.7 S, 45.75, 260/45.75 K

[56] References Cited

UNITED STATES PATENTS 3,048,568   8/1962   Cleary ............................260/79
3,317,461   5/1967   Plueddemann ...................260/46.5

OTHER PUBLICATIONS

Sanderson, Chemical Periodicity, Reinhold Publ. Co., N.Y., 1960, pg. 83

Primary Examiner—Donald E. Czaja
Assistant Examiner—M. I. Marquis
Attorney—Young and Quigg

[57] ABSTRACT

Polymers having at least one terminal alkali metal mercaptide end group per molecule are converted to products having improved oxidative stability by reaction with metal halides of Group 4a of the Periodic Table.

6 Claims, No Drawings

STABILIZATION OF POLYMER-ALKALI METAL MERCAPTIDES

This invention relates to the stabilization of polymer-alkali metal mercaptides.

In one of its more specific aspects, this invention relates to the formation of stable polymer alkali metal mercaptide-derivative intermediates.

Polymerization employing alkali metal-based initiators, such as lithium compounds, is well known. Generally, the polymers of greatest interest are derived from monomers such as conjugated dienes and monovinyl aromatic compounds. The polymerization is usually conducted in an inert hydrocarbon diluent to produce polymers containing at least one terminal alkali metal end group.

It is also known to convert these polymers into polymers having at least one terminal alkali metal mercaptide end group per molecule. In general, this is done by reacting the polymer containing the terminal alkali metal group with sulfur or with an organic disulfide. The alkali metal mercaptide terminal group so produced can be hydrolyzed to produce a mercaptan end group.

Those polymers having the alkali metal mercaptide terminal group are frequently intermediate compounds. As intermediates, they are subjected to considerable handling. Because these compounds can become useless if oxidized, expensive procedural steps must be employed to prevent their premature contact with oxidizing agents, e.g., air. Accordingly, a method of converting these easily oxidized alkali metal mercaptide polymeric forms to less easily oxidized forms would be of considerable value in the processing of polymers. The method of this invention provides such a process.

According to the method of this invention there is provided a process for the stabilization of polymer-alkali metal mercaptides which involves the conversion of the mercaptides to Group 4a metal derivatives which comprises reacting the polymer-alkali metal mercaptide with a metal halide having the general formula $R_aMX_b$.

Also, according to this invention, there is provided a Group 4a metal derivative of an alkali metal mercaptide polymer.

The method of this invention is applicable to all polymers containing at least one alkali metal mercaptide group. Preferably, the polymer will have been prepared by initiating its formation from one or more monomers with an organoalkali metal compound in an inert hydrocarbon diluent and will contain, at this stage, at least one terminal alkali metal end group, preferably lithium.

The resulting product will have been preferably reacted with sulfur or with suitable sulfur compounds, such as organic disulfides, to form the alkali metal mercaptide terminal group. For this conversion, 1,8-naphthylene disulfide is advantageously employed.

The suitable metal halides can be represented by the general formula $R_aMX_b$ in which:

M is silicon or a metal of Group 4a of the Periodic Table (Handbook of Chemistry and Physics, 46th Edit., pg. B3, Chemical Rubber Co., Cleveland, Ohio, 1964), and includes silicon, germanium, tin and lead;

R is a monovalent or divalent hydrocarbon radical containing from one to about 20 carbon atoms and includes groups such as the alkyl, aryl, cycloalkyl and alkylene;

X is a halogen;

and $a$ and $b$ are positive integers, the sum of which equals the valence of M when R is a monovalent radical and $2a + b$ being equal to the valence of M when R is a divalent radical, the value of $b$ being from 1 to 4; $a$ can be zero.

In the formula $R_aMX_b$, M is preferably tin or silicon and X is preferably chlorine.

Examples of suitable compounds complying with the above formula are silicon tetrachloride, tin tetrachloride, germanium tetrabromide, methyl trichlorosilane, eicosyl tribromotin, phenyl triiodogermanium, cyclohexyl trifluorolead, dimethyl dichlorosilane, dibutyl dichlorotin, diphenyl dichlorogermanium, di(1-naphthyl)dibromolead, trimethyl chlorosilane, trihexyl iodotin, tricyclohexyl bromogermanium, trimethyl chlorolead, diphenyl dichlorosilane, 1,1-dichlorosilacyclohexane and 1,1-dichloro stannacycloctane.

The quantity of the reactant represented by formula $R_aMX_b$ which is employed is in the range of from about 1 to about 5, preferably from about 1.5 to 3, milliequivalents per milliequivalent of alkali metal employed in the polymerization initiator. One mole of the $R_aMX_b$ compound contains a gram equivalent for each X in the molecule.

The method of this invention is carried out by mixing the reactants, optionally in the presence of an inert hydrocarbon diluent, preferably a polar compound, and bringing the temperature of the reactants within the range of from about 0° C. to about 200° C., preferably from about 50° C. to about 100° C., under any suitable pressure for a period from about 1 minute to about 100 hours or longer. The resulting product can be produced in a solution in which form it can be handled with decreased likelihood of mercaptide oxidation, or in which solution it can be treated to hydrolyze the mercaptide groups without excessive loss of the mercaptide group by the side reaction of oxidation.

The method of this invention was carried out employing a polymer-alkali metal mercaptide which had been formed by polymerizing 2–3 g of 1,3-butadiene in the presence of 0.15 millimoles of n-butyllithium at 70° C. in 120 ml cyclohexane for 0.75 hours, after which the resulting polymer product was reacted with 1,8-naphthylene disulfide at 27° C. for a period of about 3 to 5 minutes to produce the polymer-alkali metal mercaptide. Two samples of the polymer-alkali metal mercaptide were recovered and each was analyzed by an amperometric titration, with $AgNO_3$ as the titrant, to determine its mercaptan concentration.

The first of these samples was reacted with 0.04 moles silicon tetrachloride at a temperature of 50° C. for about one-half hour for the purpose of stabilizing the polymer-alkali metal mercaptide against oxidation. The second sample was not treated by the method of this invention.

Each sample was then stirred with isopropyl alcohol and air blown and agitated with air under substantially identical conditions. Analyses were again made, as before, of each sample to determine its mercaptan concentration. Results were as follows:

| Sample No. | MMoles $SiCl_4$ Reacted | Mercaptan Original | Concentration, Molal After Air Contact |
|---|---|---|---|
| 1 | 0.04 | $1.29 \times 10^{-3}$ | $1.04 \times 10^{-3}$ |
| 2 | 0 | $1.31 \times 10^{-3}$ | $1.58 \times 10^{-5}$ |

The above data illustrate the operability of the method of this invention and its effectiveness in stabilizing polymer-alkali metal mercaptides against oxidation.

These data indicate that about 99 percent of the originally-determinable mercaptan was oxidized and thus destroyed with air in the solution which was not treated in accordance with the method of this invention. In contrast, however, only about 19 percent of the originally-determinable mercaptan was oxidized in that solution which had been stabilized in accordance with the method of this invention.

The foregoing determinations of mercaptan content were based upon a method which hydrolyzes the mercaptide to the mercaptan. Inasmuch as the content of mercaptan in the two analyses for Sample No. 1 was substantially the same, the data indicate that the reaction product of the silicon tetrachloride reaction is hydrolyzable to the mercaptan to substantially the same extent as the unstabilized polymer alkali metal mercaptide compound.

It will be evident from the foregoing that various modifications can be made to the method and to the product of the method of this invention. Such, however, are considered as being within the skill of the art.

What is claimed is:

1. A method for the oxidative stabilization of a polymer prepared in the presence of an alkali-metal-based initiator and having at least one alkali metal mercaptide terminal group which comprises reacting said polymer with a halide having the formula $R_aMX_b$, said halide being employed in an amount within the range of from about 1 to about 5 milliequivalents per milliequivalent of the alkali metal of said initiator wherein:

R is a monovalent or divalent hydrocarbon radical containing from one to 20 carbon atoms;

M is selected from the group consisting of silicon, germanium, tin and lead;

X is a halogen;

$a$ and $b$ are integers, and $a$ can be zero, and $b$ has a value within the range of 1 to 4, the sum of $a + b$ being equal to the valence of M when R is a monovalent hydrocarbon radical and the sum of $2a + b$ is equal to the valence of M when R is a divalent hydrocarbon radical to produce an oxidatively stable derivative of said polymer.

2. The method of claim 1 in which the reaction is conducted at a temperature within the range of from about 0° C. to about 200° C. in an inert diluent.

3. The method of claim 1 in which said polymer having at least one alkali metal mercaptide terminal group is prepared by the polymerization of at least one monomer, said polymerization being initiated with an organoalkali metal compound.

4. The method of claim 3 in which said halide is employed in an amount within the range of from about 1 to about 5 milliequivalents per milliequivalent of said organoalkali metal compound.

5. The method of claim 1 in which said halide is silicon tetrachloride.

6. The method of claim 1 in which said alkali metal mercaptide terminal group comprises lithium.

* * * * *